May 6, 1924.

A. O. HUBBARD

WHEEL

Filed Jan. 29, 1923

1,492,851

Inventor
ARTHUR O. HUBBARD

By Paul, Paul & Moore
ATTORNEYS

Patented May 6, 1924.

1,492,851

UNITED STATES PATENT OFFICE.

ARTHUR O. HUBBARD, OF MINNEAPOLIS, MINNESOTA.

WHEEL.

Application filed January 29, 1923. Serial No. 615,537.

*To all whom it may concern:*

Be it known that I, ARTHUR O. HUBBARD, a citizen of the United States, resident of Minneapolis, county of Hennepin, State of Minnesota, have invented certain new and useful Improvements in Wheels, of which the following is a specification.

The object of my invention is to provide a wheel adapted particularly for a child's wagon with a new and improved means for mounting the wooden spokes between the hub and rim of the wheel, the rim being adapted for use with or without a rubber tire as preferred.

A further object is to provide a wheel of substantial, durable construction, one in which the connection between the rim and the spokes will be strong, elastic, and durable and the whole wheel meet the requirements of those who prefer wagons of this type having wooden-spoke wheels.

Other objects of the invention will appear from the following detailed description.

In the accompanying drawings forming part of this specification,

Figure 1:
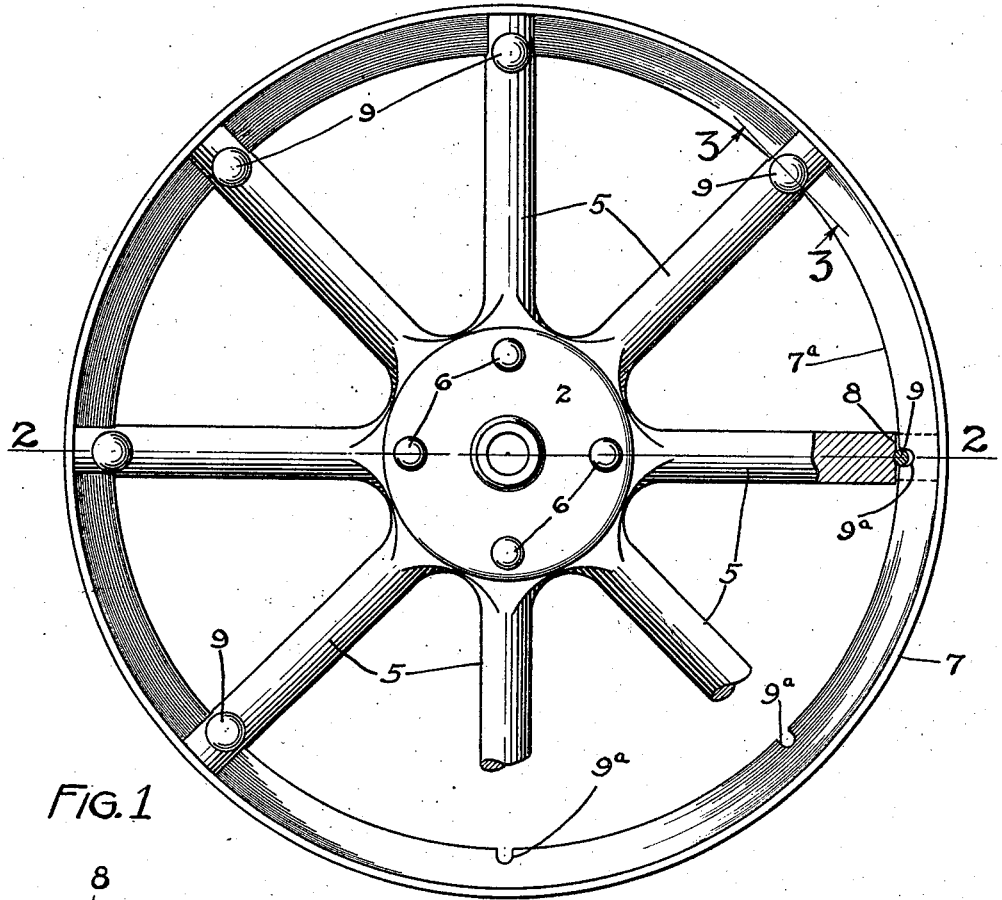
Figure 1 is a side view of a child's wagon wheel embodying my invention with parts broken away.
Figure 2:
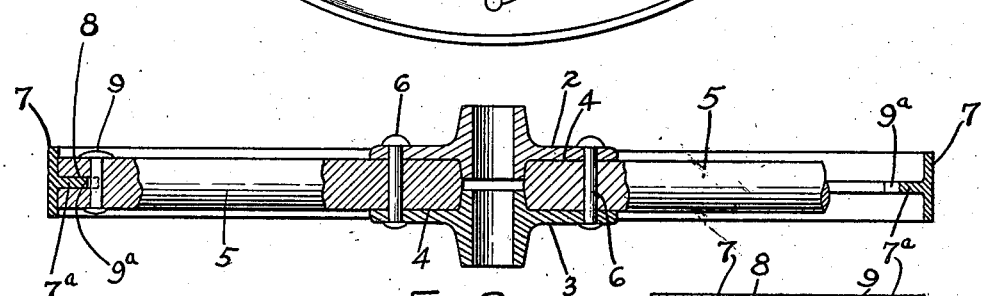
Figure 2 is a sectional view on the line 2—2 of Figure 1.

In the drawing, the hub of the wheel is shown composed of discs 2 and 3, having sockets 4 to receive the inner ends of the wooden spokes 5, the discs being rigidly clamped together by rivets 6, passing through the discs and the ends of the spokes and clamping the spokes firmly in their sockets.

The rim 7 is T-shaped in cross-section being especially rolled for this wheel, and provided with an inwardly extending annular flange arranged at a right angle to the outer portion of the rim and substantially midway between the edges thereof. The outer ends of the spokes have slots 8 therein to receive the flange which I will designate as 7ª, and rivets 9 pass through the ends of the spokes and into notches 9ª in the edge of the flange. The notches 9ª are provided at intervals in the edge of the flange 7ª opposite the spokes, and into these notches, the rivets may be easily and quickly inserted without any fitting or adjustment which might be necessary when the rivets are inserted through holes in the middle portion of the flange. I have found this method of assembling the wheel a very simple and convenient one and the rivets seated in the notches of the flange are amply sufficient to hold the spokes in place.

Figure 4:
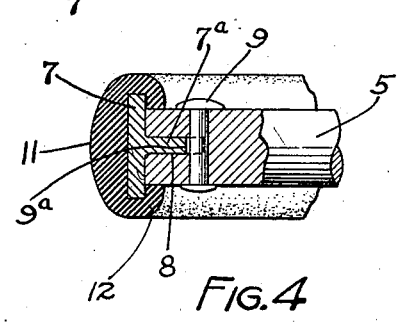
Figure 4 is a detail sectional view showing the manner of securing the outer ends of the spokes to the wheel rim.
Figure 3:
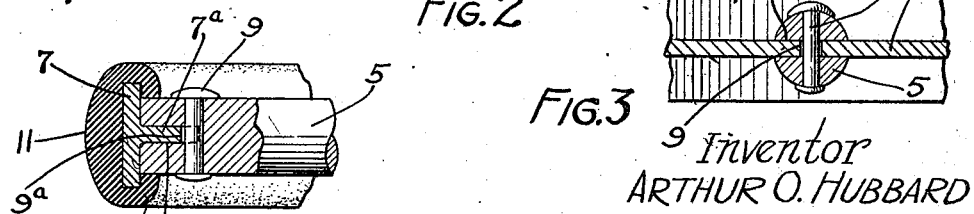
Figure 3 is a sectional view on the line 3—3 of Figure 1.

A rubber tire 11 is provided having lips 12 which may be passed around the edge of the rim as shown in Figure 4, clasping the said edges and bearing on the ends of the spokes. These tires may be used or not as preferred. There may be any suitable number of spokes provided, and each spoke can be easily and quickly secured to the flange of the rim. The outer ends of the spokes contact with the inner face of the rim and transmit the load from the hub thereto. This construction provides a child's wagon wheel of simple, inexpensive construction and one which will stand rough usage to which it may be subjected.

I claim as my invention:

1. In a wheel, a rim substantially T-shaped in cross-section, the inwardly projecting flange of said rim having recesses therein at intervals, a series of spokes having a central hub, the outer ends of said spokes being forked to receive said flange, and means mounted in the forked ends of said spokes to enter said recesses.

2. In a wheel a rim having an inwardly projecting annular flange provided with a series of notches, a series of spokes having a central hub, the outer ends of said spokes being slotted to receive said flange, and seated against the inner surface of the wheel rim, and rivets passing through the outer ends of said spokes and fitting into said notches.

In witness whereof, I have hereunto set my hand this 25th day of January, 1923.

ARTHUR O. HUBBARD.